Dec. 8, 1931.   A. STEINLE   1,835,534
BINOCULAR TELESCOPE
Filed June 5, 1929

Inventor:
Adolf Steinle

Patented Dec. 8, 1931

1,835,534

UNITED STATES PATENT OFFICE

ADOLF STEINLE, OF JENA, GERMANY, ASSIGNOR TO THE FIRM: CARL ZEISS, OF JENA, GERMANY

BINOCULAR TELESCOPE

Application filed June 5, 1929, Serial No. 368,671, and in Germany June 7, 1928.

In order to be in a position to survey the whole field of view when looking through a telescope the viewing eye must be brought into the exit pupil of the telescope. For this purpose the eyecups of the usual telescopes are constructed in such a manner that the eye is given this position as soon as the eyecup is in touch with the observer's head. However when the observer wears a device (f. i. spectacles, a gas mask or the like) preventing the eyecup from touching his face, his eye is at too great a distance from the ocular lenses and an observation is rendered difficult. In order to have a correct distance of the eye also in this case, it has been proposed to make the eyecups adjustable in the direction of the optical axes and to arrange them on the tubes containing the lenses, which method should be used also with binocular telescopes, where both eyecups were to be made adjustable and this independently of each other.

For binocular telescopes having a middle axis (which in general serves the purpose of letting the two single telescopes have different positions to each other so as to adapt the distance of the optical axes to that of the eyes), according to the present invention it is of special advantage when the two slidable eyecups are interconnected by means of a bridge that is slidably disposed on the middle axis of the telescope.

When disposing the slidable eyecups only on the tubes containing the ocular lenses, and when making them adjustable independently of each other, it is necessary to have the tubes provided with stops limiting the slide way in both directions. This, however, not only makes an exchanging of the ordinary eyecups with the adjustable ones more difficult but also permits a clogging that is not easily removed and much to be feared when the telescope is used in the field. The execution according to the invention makes the exchanging an easier one and, the stops being easily accessible, also allows an easy cleaning. In this case the bars holding the middle axis can serve as stops. The bridge holding the eyecups is suitably connected with the middle axis by means of a sleeve slidable on the same, on which sleeve an intermediate piece is disposed in such a way that it can be turned about the axis crossing the middle axis at right angles, and, together with the bar which is near the eyepiece and holds the middle axis, provides the one end, with the bar near the objective, the other end position of the slidable eyecups.

Figure 1:
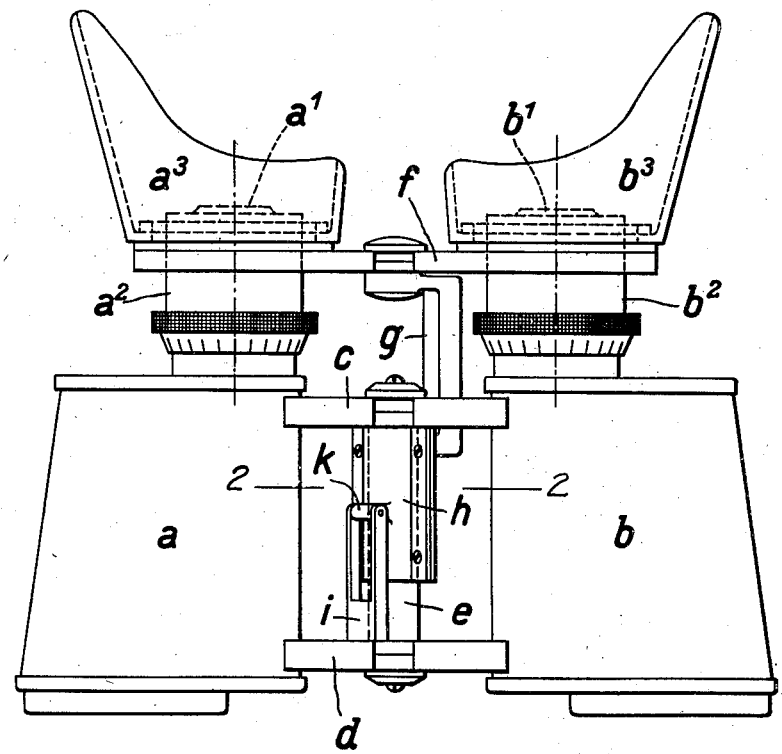
Figure 2:
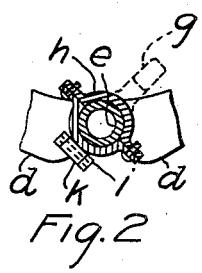

The drawings represent a telescope for use with and without gas mask, according to the invention. Fig. 1 shows a front elevation of the telescope and Fig. 2 a section on the line 2—2 in Fig. 1.

The telescope shown on the drawings consists of two single telescopes, $a$ and $b$, interconnected by means of two bars, $c$ and $d$. These bars carry a middle axis $e$ about which the two single telescopes $a$ and $b$ can be turned relatively to each other. The ocular lenses, whereof only the two eyelenses denominated $a^1$ and $b^1$ are indicated on the drawings, are provided in the short tubes $a^2$ and $b^2$. The normal eyecups are taken off from the telescope and in their stead two eyecups, $a^3$ and $b^3$, are loosely put over the tubes $a^2$ and $b^2$. The eyecups $a^3$ and $b^3$ are held by a bridge $f$ which is connected by means of a shouldered holder $g$ to a sleeve $h$ sliding on the middle axis $e$. The said sleeve resembles a clip and consists of two parts, so that it can be easily taken off from the axis $e$. On the sleeve $h$ there is provided an intermediate piece $i$ which is rotatable about an axis $k$ and serves the purpose of giving the said sleeve always the distances from the bars or, respectively, stops $c$ and $d$, which are necessary to let the eyecups $a^3$ and $b^3$ have that position in which the telescope can be used with a gas mask, as well as that which is required when the observer wants to look through without a gas mask. In the position represented in the drawings, where the intermediate piece $i$ is turned to the side of the objective, it coacts with the bar $d$, which means that the telescope is ready for use without a gas mask.

I claim:

1. A binocular telescope consisting of two single telescopes, between the two single telescopes a middle axis about which the said single telescopes can be turned relatively to each other, an ocular fitted to each one of the single telescopes, an eyecup loosely attached over each of the said two oculars, between the oculars a bridge carrying on either end one of the said eyecups, a holder carrying the said bridge, the said holder being disposed on the middle axis and slidable on the same in longitudinal direction.

2. A binocular telescope consisting of two single telescopes, between the two single telescopes a middle axis about which the said single telescopes can be turned relatively to each other, an ocular fitted to each one of the single telescopes, an eyecup loosely attached over each of the said two oculars, between the oculars a bridge carrying on either end one of the said eyecups, a holder carrying the said bridge, the said holder having a sleeve being disposed on the middle axis and slidable on the same in longitudinal direction.

3. In a binocular telescope according to claim 2, the said holder consisting of two parts arranged round the middle axis similar to a clip.

4. In a binocular telescope according to claim 2, a stop being disposed on each end of the middle axis, and a stop being adjustably disposed on the said sleeve.

5. A binocular telescope consisting of two single telescopes, between the two single telescopes a middle axis about which the said single telescopes can be turned relatively to each other, an ocular fitted to each one of the single telescopes, an eyecup loosely attached over each of the said two oculars, between the oculars a bridge carrying on either end one of the said eyecups, a holder carrying the said bridge, the said holder having a sleeve being disposed on the middle axis and slidable on the same in longitudinal direction, one stop each being disposed on the two ends of the middle axis, and an intermediate piece being attached to the sleeve and rotatable about an axis crossing the middle axis at right angles so as to coact with the one stop when turned to the side of the objective, and with the other when turned to the side of the ocular.

ADOLF STEINLE.